Nov. 15, 1932.   E. A. HESTER   1,887,715
AUTOMOBILE TIRE PUMP

Filed April 3, 1931

INVENTOR
Edgar A. Hester
by William B. Jasper
Attorney.

UNITED STATES PATENT OFFICE

EDGAR A. HESTER, OF PITTSBURGH, PENNSYLVANIA

AUTOMOBILE TIRE PUMP

Application filed April 3, 1931. Serial No. 527,417.

This invention relates to tire pumps for inflating the inner tubes of vehicle wheels and it is among the objects thereof to provide tire pumps of a character to render them a permanent attachment to the vehicle wheels whereby the tires are kept inflated to a predetermined pressure at all times.

A further object of the invention is the provision of tire pumps which shall be adapted to be mounted on or in the hub of the vehicle wheel and which shall be adapted to pump air to the inner tube of the wheel without requiring any operative connections with the drive mechanism of the vehicle and without absorbing any appreciable amount of the power of the vehicle while in use.

Another object of the invention is the provision of pump mechanism of the above designated character which shall be of simple, durable mechanical construction, which shall be designed to be contained within the hub cap of the wheel and which shall be designed to prevent any unbalance of the wheel on which it is mounted.

It is generally recognized that the wearing qualities and the life of a composite rubber fabric tire for automobiles or the like is dependent upon the care exercised in keeping the inner tubes inflated to the proper air pressure. If the tire is permitted to become soft, excessive strains will be imposed upon the fabric of the tire which results in its deterioration and consequent failure of the tire shoe.

It is also well recognized that operators of automotive vehicles generally neglect the tires as it is more or less of a nuisance to have the tires checked at frequent intervals or to supply them with the necessary air to keep them inflated to a given pressure.

In accordance with the present invention, means are provided to maintain the tires at uniform predetermined pressure at all times without requiring any attention by the operator, and to this end individual pump mechanisms are employed on each wheel of the vehicle with means for adjusting the pressure so that different pressures may prevail in the front and rear wheels of the vehicle if desired.

By means of the invention the pressure in each tire will be maintained uniform at all times thereby improving the riding qualities of the vehicle. Also it will prevent swinging of the vehicle in response to sudden application of brakes which is commonly experienced when the tires are of unequal pressures and the adjustment of pressures also renders the pump interchangeable for vehicles using different tire pressures.

Figure 1:
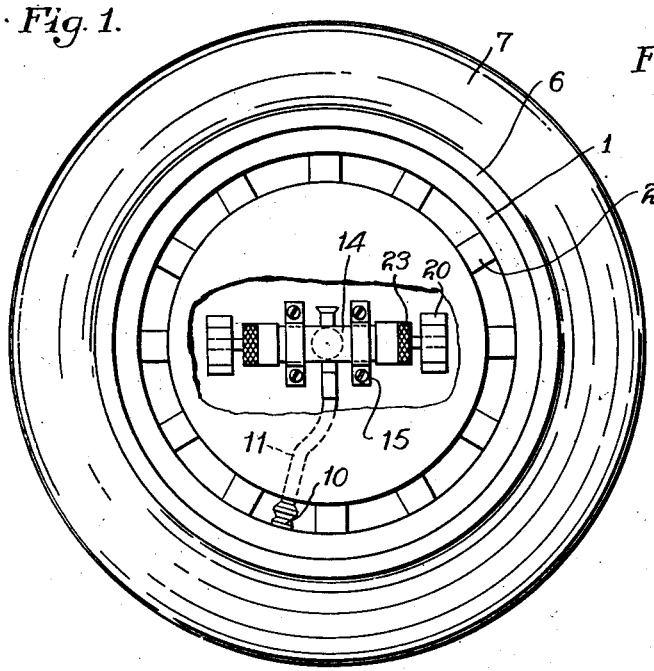
Figure 2:
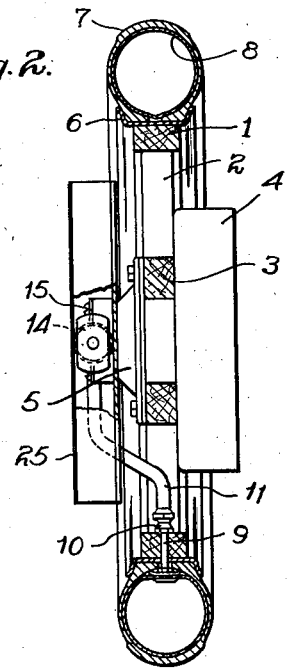
Figure 3:
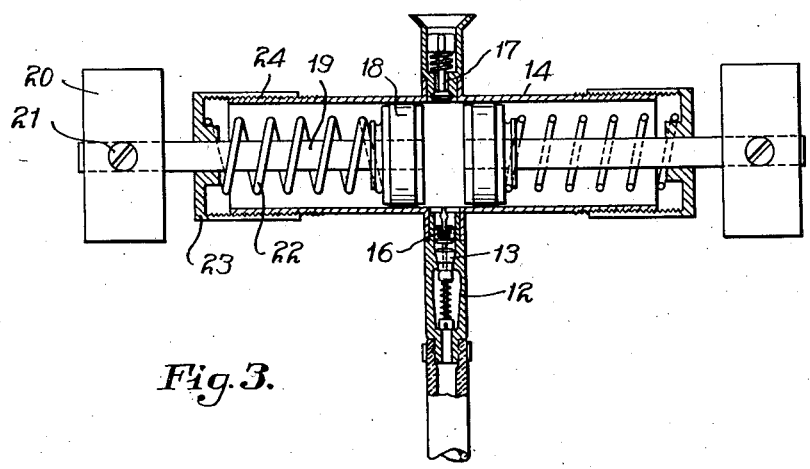

The pump mechanism embodying the features of this invention will be more clearly defined in connection with the accompanying drawing in which like reference characters designate like parts, and in which Figure 1 is a side elevational view of a vehicle wheel illustrating the application of a tire-inflating pump mechanism embodying the principles of this invention;

Figure 2 a sectional elevational view of the wheel and pump illustrating the connection of the latter to the tire inner tube; and Figure 3 a cross sectional view of the pump mechanism per se.

With reference to the several figures of the drawing, the structure therein illustrated comprises a vehicle wheel consisting of the rim 1, spokes 2, and hub 3, the latter being provided with the usual brake drum or casing 4 and an end or hub cap or housing 5. The rim of the wheel is provided with a steel rim 6 on which the shoe or tire 7 is mounted. An inner tube 8 disposed within the shoe is provided with the usual valve stem 9 having a connection 10 which in the present instance is connected by a rubber or other flexible hose 11 to a valve stem 12, Figure 3, in which the valve 13 is contained.

Mounted on the hub bracket 5 is a pump casing 14 which is secured by straps 15 although it may be fastened in any suitable or convenient manner, the housing being connected to the valve stem 12 at 16. An inlet valve 17 is provided by means of which the usual air hose can be applied to supply air direct to the inner tube of the tire when the pump is inactive and through which air is drawn into the pump chamber by the pistons when the pump is operating.

Disposed within the cylinder pump casing 14 are a pair of pistons 18 having stems or rods 19 provided with adjustable weights 20, the weights being fastened on the rods by means of set screws 21.

Disposed around the rods 19 and within the casing 14 are helical springs 22 which abut against the pistons 18 and against end caps 23 which are screwed on threaded ends 24 of the cylinder casing 14 and are adjustable thereon to vary the length of springs 22 whereby the pressure on the pistons 18 may be varied. The pump structure is symmetrical in every respect, the piston rods and weights and the coil springs being of the same weight and dimensions on each side of the center line running vertically through the valves 12 and 17, and when mounted with its center line in axial alinement with the wheel axle, the pump structure is in perfect balance. The pump may be contained within a casing or hub cap 25 so as to be entirely covered and protected from injury, moisture and dirt.

The operation of the device is briefly as follows: When the pump is mounted on the hub of the wheel in the manner shown in Figures 1 and 2, the pistons 18 will be normally biased by springs 22 to the position shown in Figure 3. As the wheel of the vehicle rotates, the pistons 18 will retain their normal position until the centrifugal force of the weights 20 is sufficient to overcome the pressure of the coil springs 22, this condition developing as the vehicle increases its speed, and at given speeds the pistons 18 will move radially outwardly against their retaining springs. As the vehicle again slows down, the springs 22 will force the pistons inwardly to the positions shown in Figure 3.

On the outward stroke of the pistons 18, air is drawn through the valve 17 into the cylinder chamber of the pump and when the pistons contract to their normal position, valve 17 is closed and the air in the cylinder is displaced through the passage controlled by the valve 13 into the inner tube of the tire.

The springs 22 are of such strength that they will exert a given pressure on the pistons 18, such pressure corresponding to the pressure required in the inner tube of the tire, such as 35 or 40 pounds. By adjusting the end caps 23 of the pump, the pressure on the pistons 18 may be varied; in any event however, the pressure cannot exceed a predetermined amount within the range of adjustment of the caps, and the strength of the helical springs.

By adjusting the position of the weights 20 on the piston rods 19 the pump may be rendered operative in response to faster or slower speed of travel of the vehicle as desired. Similarly adjustment of weight against springs 22 can be effected by varying the mass of the weights 20 as by employing a series of washers which may be added to or some of which may be removed to obtain variation of mass.

Once the tire has been inflated to its proper pressure the operation of the pump mechanism will maintain this pressure at all times, as it takes but a small amount of pumping action to supply pressure lost by leakage of the valves or at the joints of the stem and inner tube, and when this pressure has been built up to the desired value, the springs 22 will be powerless to increase it beyond this point.

Similarly, the springs 22 will not be compressed an excessive amount by the force exerted by the weights 20, since the strength of the springs will counteract the centrifugal force until a balanced condition exists at which time there will be no further movement of the piston in the pump housing until the pressure in the inner tube of the tire falls.

By adjusting the end caps 23 different pressures may be maintained in the front and rear wheels, or coil springs 22 of different lengths or diameters or of different pitch may be employed to produce different pressures in the several wheel sets.

It is evident from the foregoing description of this invention that pump mechanism embodying the features thereof is of simple, durable mechanical construction, of light weight and compact form, and can readily be mounted on the wheel hub of a vehicle and within the hub cap.

Although one embodiment of the invention has been herein illustrated and described, it will be obvious to those skilled in the art that various modifications may be made in the details of construction without departing from the principles herein set forth.

I claim:

1. A tire pump for vehicle wheels comprising, a pump cylinder mounted centrally of the hub of the wheel, valved means connecting said cylinder with the inner tube of the wheel, a pair of pistons mounted in coaxial alinement in said cylinder, means normally urging said pistons toward each other, and means responsive to the speed of rotation of the wheel to cause said pistons to separate.

2. A tire pump for vehicle wheels comprising, a pump cylinder mounted centrally of the hub of the wheel with its longitudinal axis extending radially of the hub axis, a pair of pistons operatively disposed in said cylinder, springs urging said pistons toward each other, and valved means connecting said cylinder with the inner tube of the wheel, said pistons being adapted to operate in response to the speed of rotation of said wheel to draw air into the pump chamber and to pump it into the inner tube.

3. A tire pump for vehicle wheels comprising a cylinder adapted for mounting on the hub of the wheel, a valved conduit connection for said cylinder and the inner tube of the tire, a pair of pistons mounted for radial movement in opposite directions in said cylinder, means for separating said pistons in response to the speed of rotation of the wheel, and means for contracting the pistons to compress the air and conduct it to the inner tube of the tire.

4. A tire pump for vehicle wheels comprising a cylinder adapted for mounting on the hub of the wheel, valved conduit connection for the cylinder and the inner tube of the tire, a pair of pistons mounted for radial movement in opposite directions in said cylinder, a spring means normally biasing said pistons toward each other, adjusting means for regulating the force of the springs, and weights carried by said pistons to render them responsive to the speed of the wheel to actuate the piston members.

5. A tire pump for pneumatic tire comprising a pump cylinder mounted on the hub of the vehicle wheel to be rotated therewith, a pair of pistons in said cylinder, piston rods extending beyond said cylinder, weights adjustably mounted on said rods, helical springs disposed in said cylinder and abutting at one end against said pistons, adjustable end caps for said cylinder constituting an abutment for the other end of said springs, a valved port for admitting air to said cylinder, and a valved connection leading from the cylinder to the inner tube of the tire.

6. A tire pump for vehicle wheels comprising a cylinder adapted for mounting on the hub of the wheel, valved means connecting said cylinder with the inner tube of the wheel, a piston mounted for radial movement in said cylinder, spring means normally biasing said piston towards the hub axis, and a balanced weight for said piston to render it responsive to the speed of the wheel to actuate the piston member.

7. A tire pump for vehicle wheels comprising a cylinder for mounting on the hub of the wheel, valved means connecting said cylinder with the inner tube of the wheel, a piston in said cylinder, spring means normally biasing said piston to one position of its stroke, and a weight for said piston to render it responsive to the speed of the wheel to actuate the piston member, said weight and piston being arranged to maintain true balance of the wheel during operation of the pump.

In testimony whereof I have hereunto set my hand.

EDGAR A. HESTER.